G. D. HAWORTH.
Check-Rower for Corn-Planters.

No. 160,055. Patented Feb. 23, 1875.

Witnesses.
Wm H. Wilson
Jas. Reid

Inventor
George D. Haworth.
per Levi P. Graham,
attorney.

THE GRAPHIC CO. PHOTO-LITH. 39 & 41 PARK PLACE, N.Y.

UNITED STATES PATENT OFFICE.

GEORGE D. HAWORTH, OF DECATUR, ILLINOIS.

IMPROVEMENT IN CHECK-ROWERS FOR CORN-PLANTERS.

Specification forming part of Letters Patent No. 160,055, dated February 23, 1875; application filed October 17, 1874.

*To all whom it may concern:*

Be it known that I, GEORGE D. HAWORTH, of the city of Decatur, county of Macon and State of Illinois, have invented a certain Improved Check-Rower for Corn-Planters; and I hereby declare the following to be a specification of the same.

My invention consists in producing a simplified check-rower, by means to be hereinafter specified, that will operate twice for every stop on the cord, will lessen the side tension or leverage, and can be attached to the planter in the rear of the dropping apparatus, which last arrangement is specially adapted to what are commonly known as one-horse planters.

Figure 1:
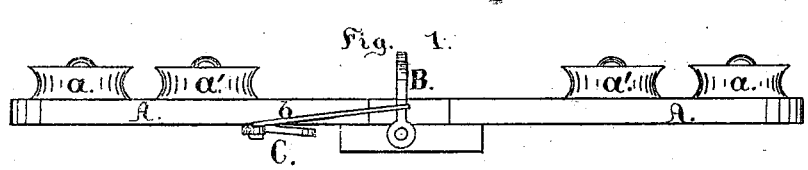
Figure 2:
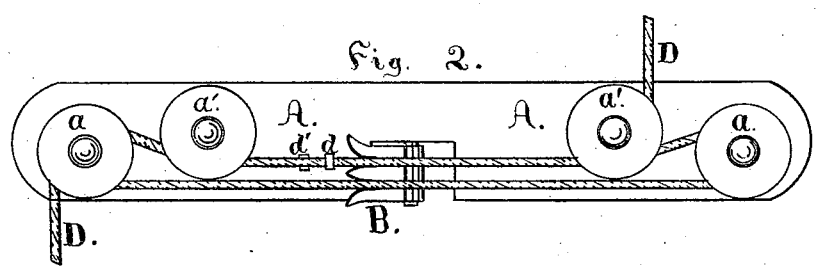
Figure 3:
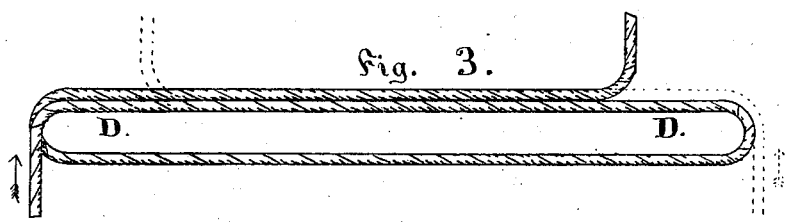

In the drawing accompanying this specification, and forming a part thereof, Figure 1 is a front elevation of my invention; Fig. 2, a plan of the same with check-row cord attached. Fig. 3 shows the manner of attaching said cord, and Fig. 4 the operation of the cord and pulleys when attached to a check-row bar having two rocker-plates as used on two-horse planters.

The part indicated by reference-letter A represents the check-row bar. $a$ $a$ $a'$ $a'$ are pulleys attached to said bar in about the position shown in Fig. 2, with the distance around the outside pulleys $a$ $a$ at least as great as the distance between the stops on the cord. B represents a double-slotted rocker-plate, pivoted as shown. C is an elbow-lever attached to the under side of the check-row bar, and $b$ a rod connecting said lever with rocker-plate B. D represents the check-row cord, provided with stops arranged twice the distance between hills apart. It is attached as shown in Figs. 2 and 3, and is always discharged from an inside pulley, $a'$. As shown in the drawing, said cord extends once around pulleys $a$ $a$, and to an opposite inside pulley, $a'$, again passing twice through the inside slot or crotch in rocker-plate B.

Following the cord in the direction indicated in Fig. 3, it will be seen that a stop thereon will first come in contact with the inside crotch of the rocker-plate, after operating which it passes around an outside pulley, operates B in its outside crotch, leaving it in its original position, and passes on back to the inside again; but, owing to the fact that the distance around the pulleys $a$ $a$, plus the deflection caused by pulleys $a'$ $a'$, is greater than the distance between the stops on the cord, a new stop is now in advance of it, (see Fig. 2,) in which $d$ represents the new, and $d'$ the old, stop attached to the under cord. This new stop $d$ now operates the plate B, after which $d'$ passes over and is discharged from pulley $a'$, and is followed by $d$ and other stops in succession. The operation is precisely the same when the planter is reversed and the cord received on the left side.

Figure 4:
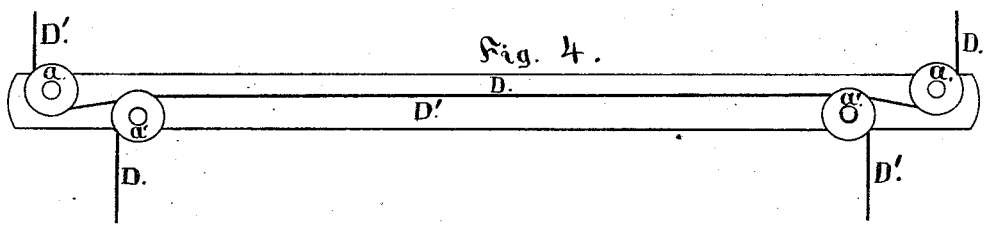

In Fig. 4, D represents the cord running onto the right side of the planter, and is discharged from the left. D' represents the same cord running in a reversed direction. In this figure the side-draft principle is illustrated irrespective of the afore-described arrangement of the cord on the pulleys, for as the tension is always on the rear of the planter, it is evident that the nearer the center the cord leaves the planter the less leverage it will leave on the side thereof, and the inside pulleys, $a'$ $a'$, in my device may be arranged as near the center as the working of the rocker-plates will admit without altering the operation of the cord.

In turning the planter one outside pulley throws off while the other takes up cord. This peculiarity, together with the fact that the pulley that receives the cord is farther from the rocker-plate than the one that discharges it, permits the attachment of the check-rower somewhat to the rear of the dropper on the corn-planter, which is a very desirable position, especially on a one-horse planter, it being the place least affected by side draft.

Having thus described my invention, what I claim as new, and desire to secure by Letters Patent, is—

1. A vibrating tappet, B, pivoted on a check-row bar, or otherwise attached to a corn-planter, and provided with two crotches, arranged as described, so that the check-row cord, in passing through said crotches, will produce a reciprocating motion, substantially as and for the purpose herein specified.

2. Pulleys $a$ $a$ $a'$ $a'$, arranged as described, so that a check-row cord will be received by an outside pulley, $a$, and discharged by an inside pulley, $a'$, and when the planter is reversed will be in a correct position to receive the cord on the opposite side of the planter, substantially as and for the purpose herein specified.

3. Cord D, arranged as described, with pulleys $a\ a\ a'\ a'$, so that every stop will operate rocker-plate B in either slot alternately, thereby producing a reciprocating motion by the use of one rocker-plate, substantially as and for the purpose set forth.

4. Pulleys $a\ a\ a'\ a'$, rocker-plate B, lever C, rod $b$, and cord D, all constructed and arranged to operate as a check-rower, substantially in the manner and for the purpose set forth.

GEO. D. HAWORTH.

Witnesses:
J. S. DEMPSEY,
LEVI P. GRAHAM.